Figure 1:
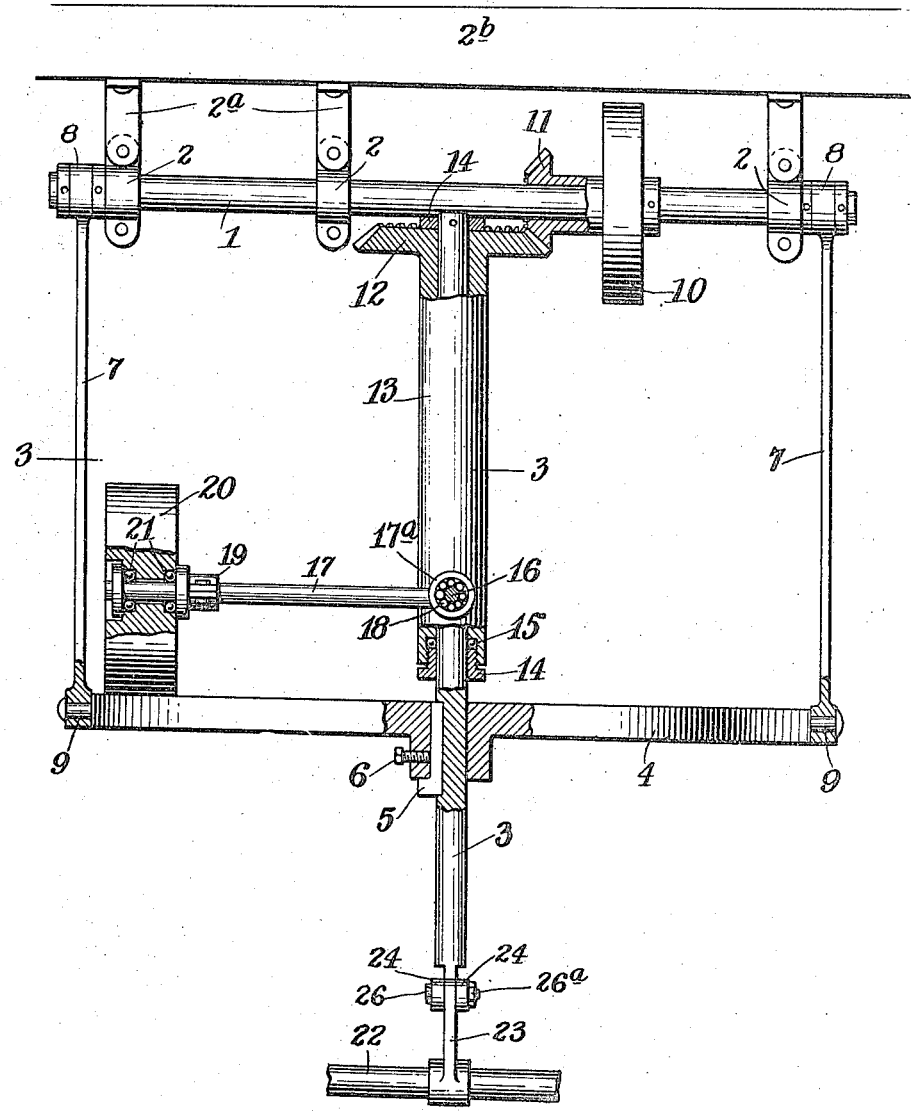

O. H. GENTRY.
POWER TRANSMITTING MECHANISM.
APPLICATION FILED DEC. 29, 1916.

1,239,900.

Patented Sept. 11, 1917.
3 SHEETS—SHEET 1.

Inventor
Oliver H. Gentry
By his Attorneys

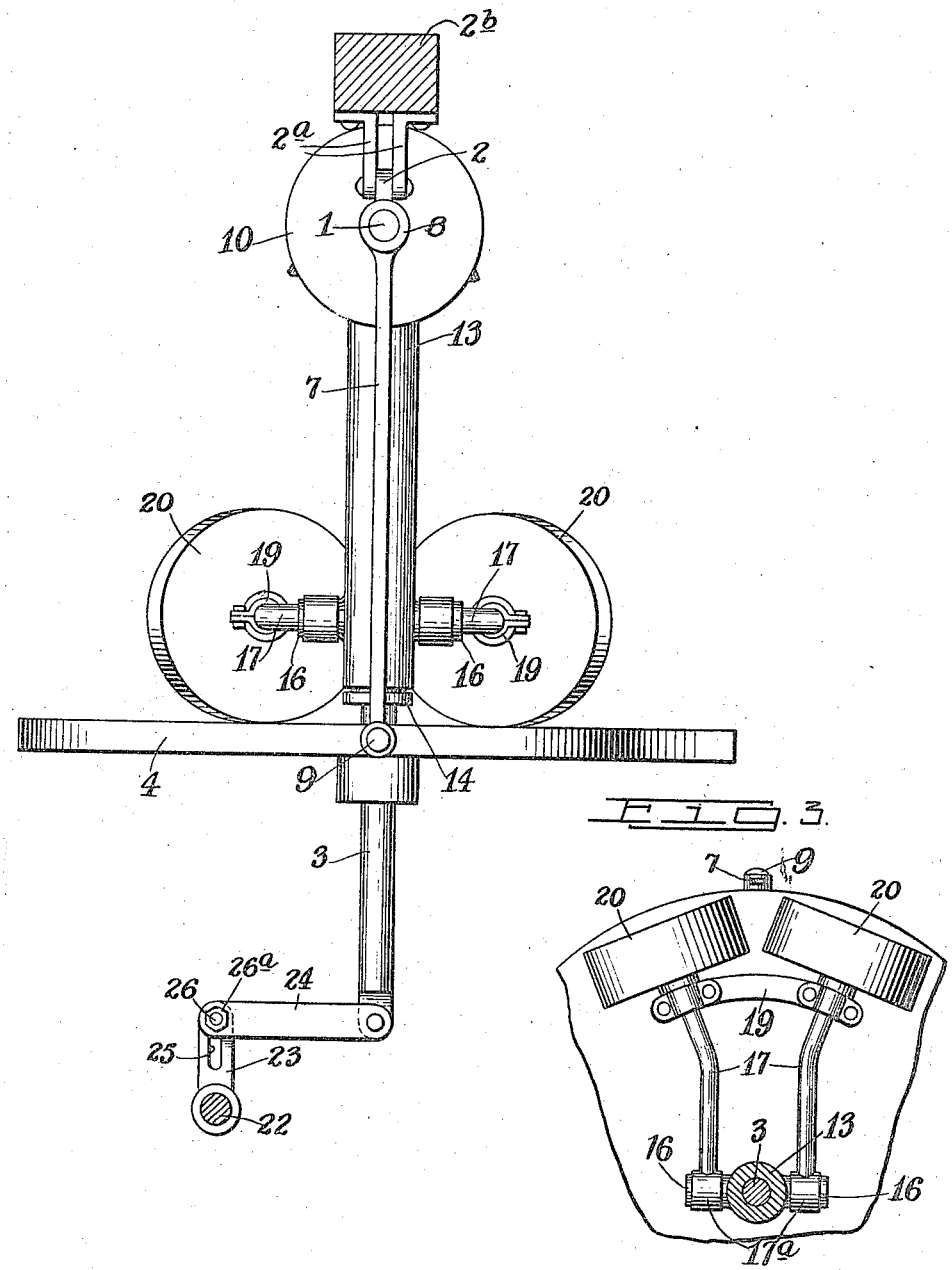

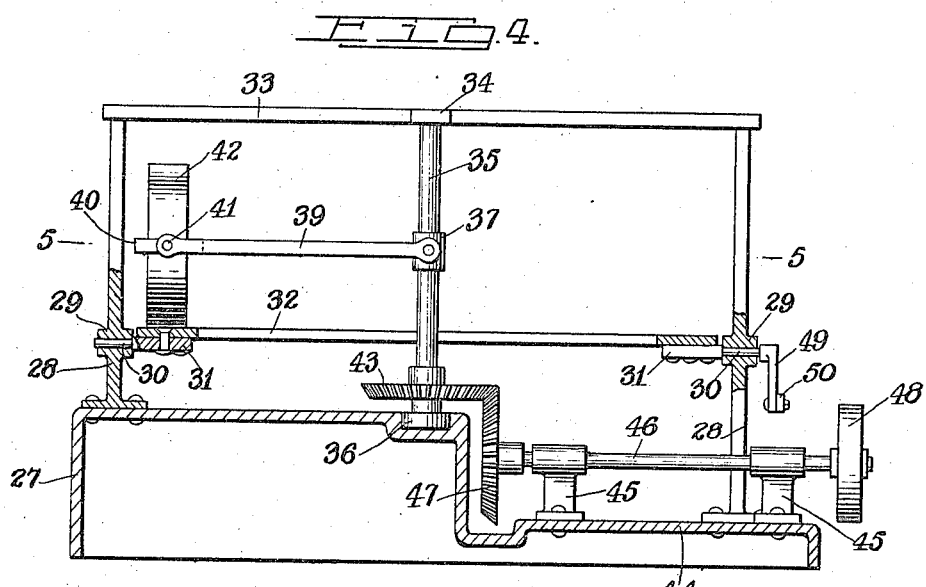
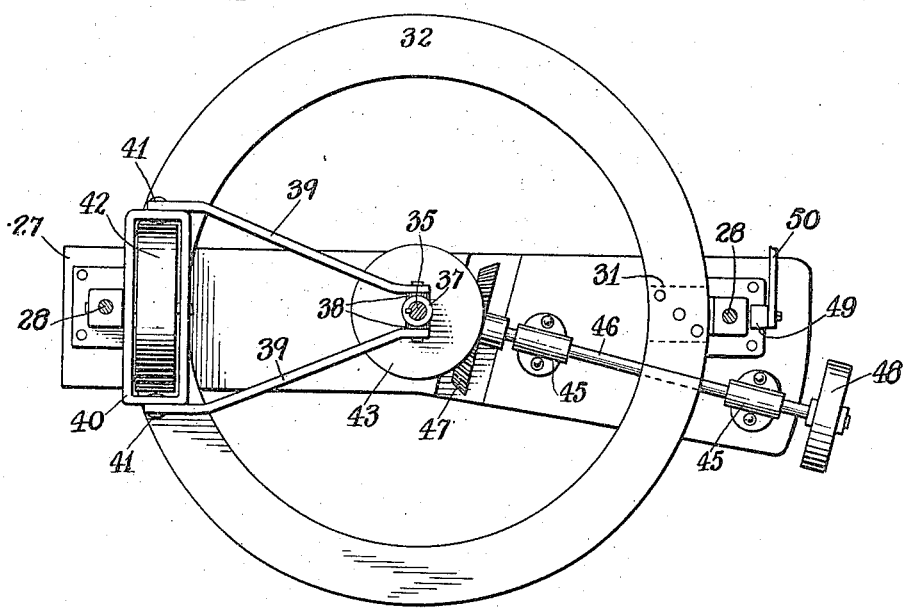

UNITED STATES PATENT OFFICE.

OLIVER HOWARD GENTRY, OF WESTWOOD, NEW JERSEY.

POWER-TRANSMITTING MECHANISM.

1,239,900.  Specification of Letters Patent.  Patented Sept. 11, 1917.

Application filed December 29, 1916. Serial No. 139,452.

*To all whom it may concern:*

Be it known that I, OLIVER H. GENTRY, a citizen of the United States, and residing at Westwood, in the county of Bergen and State of New Jersey, have invented certain new and useful Improvements in Power-Transmitting Mechanism, of which the following is a specification, such as will enable those skilled in the art to which it appertains to make and use the same.

This invention relates to means for transmitting power, and the object thereof is to provide an improved apparatus of this class which is simple in construction, efficient in use and comparatively inexpensive, and with this and other objects in view the invention consists in an apparatus of the class specified, constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a sectional side view of my improved apparatus, part of the construction being broken away or shown in section;

Fig. 2 a similar view of the apparatus but at right angles to that shown in Fig. 1;

Fig. 3 a sectional plan view on the line 3—3 of Fig. 1.

Fig. 4 a view similar to Fig. 1 but showing a modification; and,

Fig. 5 a horizontal section on the line 5—5 of Fig. 4.

In the practice of my invention, as shown in Figs. 1 to 3 inclusive, I provide a horizontally arranged rock shaft 1 which is mounted in any suitable supports or bearings 2, which may be suspended from, or connected with, any suitable supports 2ª secured to or connected with a beam or other support 2ᵇ.

The shaft 1 is provided at a predetermined point and intermediate of its ends, and preferably centrally thereof with a supplemental depending arm shaft 3 which is rigidly secured to the shaft 1 by welding or by a T-coupling or in any other way, and secured to the arm shaft 3 at a predetermined distance below the shaft 1 is a disk 4, a key 5 being preferably used for securing said disk to said shaft against rotation thereon, and a set screw 6 is also employed, and this construction secures the disk 4 to the shaft 3 against either vertical or rotary movement.

A pair of link braces 7 are also provided for connecting the periphery of the disk 4 with the end portions of the shaft 1, and said link braces are provided at their upper ends with bearing heads 8 through which the shaft 1 passes, and at their lower ends with other bearing heads through which are passed pins 9 by which said link braces are connected with the disk 4.

A belt pulley or other suitable power transmitting device 10 is rotatably mounted on the shaft 1, and said pulley is provided with a hub sleeve having a beveled pinion 11, which meshes with a beveled gear 12 at the upper end of a sleeve 13 which is mounted on the arm shaft 3, and which is spaced on said arm shaft and held in proper position thereon by collars 14, and said sleeve is also preferably provided at its lower end with ball bearings 15.

The sleeve 13 is provided on the opposite sides of its lower end portion with trunnions 16 with which a pair of radially arranged arms 17 are pivotally connected by means of tubular heads 17ª through which the trunnions 16 pass, and with which the arms 17 are provided, and this connection is also preferably provided with ball bearings 18.

The radial arms 17 are connected by a transverse brace or link member 19 and weight rollers 20 are rotatably mounted on the outer ends of the arms 17 and bearing, or are adapted to bear on, and to travel upon and around the disk 4, which forms a track or runway for this purpose, and the said rollers are preferably provided with anti-friction bearings 21.

It is also necessary to provide means for oscillating the arm shaft 3 in a vertical plane and for this purpose, in the construction shown, I provide a horizontal shaft 22 with which is connected a crank arm 23 with which is connected a link 24 which is connected with the lower end of the shaft 3, and the crank arm 23 is provided with a slot 25 and the bolt 26 which connects the link 24 with the crank arm 23 passes through said slot, and said bolt is provided at one end with a nut 26ª, and by means of this construction the connection of the parts 23 and 24 may be made an adjustable connection, so that the radius of movement may be varied, and the extent of the oscillation of the shaft 3 regulated.

In the operation of the apparatus with the construction shown, the shaft 22 is oscillated about its axis and the shaft 3 correspondingly oscillated in a vertical plane, and the disk 4 is swung about shaft 1 as an axis, the opposite side portions thereof being alternately raised and lowered, and this operation causes the weight rollers 20 to move around said disk and to rotate the sleeve 13, and the motion of said sleeve is transmitted through the gears 11 and 12 to the pulley or other device 10 and the power thus transmitted may be used for any purpose in the ordinary way, and the power so transmitted will be governed by the conditions of operation, and construction, and will depend on the diameter of the disk 4, the weight of the rollers 20, and the extent of oscillation of the shaft 3 and the rapidity of the operation of said parts.

In Figs. 4 and 5 of the drawing, I have shown a modification which consists simply in locating the power transmitting means below instead of above the disk 4, as in the construction shown in Figs. 1 to 3 inclusive, and in said figures I have shown at 27 a base or support on the opposite ends of which is mounted standards 28 having bearing members 29 in which are mounted trunnions 30 of plates 31 which are secured to the bottom of an annular plate 32, as clearly shown in Fig. 4, and the standards 28 extend above the annular plate 32 and are connected by a cross head construction 33 in the center of which is a bearing 34 in which is mounted a vertical rotatable shaft 35, which has a bearing in the base or support 27 as shown at 36, and secured centrally of the shaft 35 is a sleeve 37 having oppositely arranged trunnions 38 to which are pivoted radial arms 39 to the free ends of which are pivoted a frame 40, as indicated at 41, and rotatably mounted in said frame is a weight roller 42 which is adapted to bear on and travel upon and around the annular plate 32, as will be readily understood.

Secured to the lower end of the shaft 35 is a bevel gear 43, and the base 27 is reduced at one end as shown at 44, and mounted on said reduced portion are bearing members 45 in which is rotatably mounted a horizontal shaft 46, one end of which is provided with a bevel gear 47 which meshes with the bevel gear 43, and on the other end of which is mounted a pulley or similar device 48.

The trunnion 30 of one of the plates 31 is extended beyond the corresponding bearing 29, and secured thereto is a crank arm 49 with which is connected a link 50 which may be operated by any suitable power means to give the crank arm 49 an oscillating movement, which movement will oscillate the annular plate 32, and the movement of said crank will be so timed as to oscillate said annular plate 32 when the roller 42 in its operation around said plate reaches a position at approximately 90° from that indicated in Fig. 5, and when the roller 42 reaches a position opposite to the first named position.

It will be noted that in the construction shown in Figs. 4 and 5, the annular plate 32 which forms an annular track or runway is given an oscillating or inclined movement direct, and the roller 42 rotating thereon will rotate the shaft 35, the beveled gear 43 thereon, and the beveled gear 47 will be operated to rotate the shaft 46, and the pulley 48 mounted thereon, and it will also be understood that while I have shown and described two forms of devices for producing the desired result, my invention is not limited to the details of construction herein shown and described, and changes therein and modifications thereof may be made, within the scope of the appended claims, without departing from the spirit of my invention or sacrificing its advantages.

Having fully described my invention, what I claim as new and desire to secure by Letters Patent, is:—

1. In a machine of the class described, a shaft, an oscillating arm secured thereto, a power transmitting element revolubly mounted on said shaft, a revoluble element mounted on said arm and geared to said power transmitting element, a tiltable runway mounted on said arm, means for oscillating said arm and thereby tilting said runway first in one direction and then in the reverse direction, an arm extending from said revoluble element, and a weight roller on said arm and arranged to travel around said runway.

2. In a machine of the class described, the combination of a rock shaft, a power transmitting element revoluble on the rock shaft, an oscillating arm attached to said rock shaft and arranged at an angle thereto, power driven means to oscillate said shaft arm, a disk fixed to said shaft arm, a tubular shaft revoluble on said shaft arm and geared to said power transmission element, an arm attached to said tubular shaft, and a weight roller mounted on said arm and arranged to travel around and on said disk.

3. In a machine of the class described, a shaft, an oscillating arm secured thereto, a power transmitting element revolubly mounted on said shaft, a member rotatably mounted on said arm and geared to said power transmitting element, a tiltable runway mounted on said arm, means for oscillating said arm and thereby tilting said runway, an arm secured to said member and a pair of weight rollers connected with said last named arm and adapted to travel around said runway.

4. In a machine of the class described, an oscillatory element, a member mounted on said element and rotated by the oscillation thereof, a power transmitting element geared to said member, and means independent of said power transmitting element for giving said oscillatory element its movement, said means being positively connected with said element.

In testimony that I claim the foregoing as my invention I have signed my name in presence of the subscribing witnesses this 26th day of December 1916.

OLIVER HOWARD GENTRY.

Witnesses:
M. S. DONOVAN,
CORNELIUS A. SPINDLER.

Copies of this patent may be obtained for five cents each, by addressing the "Commissioner of Patents, Washington, D. C."